US009535651B2

(12) United States Patent  
Khalatian

(10) Patent No.: US 9,535,651 B2
(45) Date of Patent: Jan. 3, 2017

(54) CO-BROWSING SYSTEMS AND METHODS

(75) Inventor: Igor Khalatian, Morganville, NJ (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 225 days.

(21) Appl. No.: 12/970,501

(22) Filed: Dec. 16, 2010

(65) Prior Publication Data

US 2011/0154219 A1    Jun. 23, 2011

Related U.S. Application Data

(60) Provisional application No. 61/288,118, filed on Dec. 18, 2009, provisional application No. 61/289,499, filed on Dec. 23, 2009.

(51) Int. Cl.
| | | |
|---|---|---|
| G06F 15/16 | (2006.01) | |
| G06F 17/00 | (2006.01) | |
| G06F 3/00 | (2006.01) | |
| G06F 3/14 | (2006.01) | |
| G09G 5/14 | (2006.01) | |

(52) U.S. Cl.
CPC .............. *G06F 3/1462* (2013.01); *G09G 5/14* (2013.01); *G09G 2370/027* (2013.01)

(58) Field of Classification Search
CPC ...... G06F 3/0481; G06F 3/1454; H04L 29/06; H04L 69/329
USPC .......................... 715/751, 753; 709/204, 205
See application file for complete search history.

(56) References Cited

U.S. PATENT DOCUMENTS

| | | | | |
|---|---|---|---|---|
| 5,107,443 A | * | 4/1992 | Smith et al. .................. | 715/751 |
| 5,515,491 A | * | 5/1996 | Bates .................... | G06F 3/0481 |
| | | | | 715/754 |
| 5,838,906 A | | 11/1998 | Doyle et al. | |
| 5,872,923 A | * | 2/1999 | Schwartz ................ | G06F 3/038 |
| | | | | 348/E7.083 |
| 5,884,014 A | | 3/1999 | Huttenlocher et al. | |
| 5,960,411 A | | 9/1999 | Hartman et al. | |

(Continued)

FOREIGN PATENT DOCUMENTS

| | | |
|---|---|---|
| WO | 2007073209 | 6/2007 |
| WO | 2008008806 A2 | 1/2008 |
| WO | 2008008806 A3 | 10/2008 |

OTHER PUBLICATIONS

U.S. Appl. No. 11/456,613, Aug. 8, 2008, Non-Final Office Action.

(Continued)

*Primary Examiner* — Jordany Nunez
(74) *Attorney, Agent, or Firm* — Kilpatrick Townsend & Stockton LLP

(57) ABSTRACT

Described are systems and methods for screen sharing between host and agent computing systems. At a time before capturing the screen of the host computing system, each open window corresponding to a browser process is identified. Certain information is acquired about each browser process. It is determined, in response to the certain information acquired about each browser process, whether the open window corresponding to that browser process is eligible for screen capture. For each eligible open window, each visible portion of that eligible open window is captured. Capture of an image on the screen of the host computing system is limited to each visible portion of each eligible open window.

16 Claims, 7 Drawing Sheets

(56) References Cited

U.S. PATENT DOCUMENTS

| | | | |
|---|---|---|---|
| 6,308,199 B1* | 10/2001 | Katsurabayashi | 709/204 |
| 6,331,855 B1 | 12/2001 | Schauser | |
| 6,396,520 B1 | 5/2002 | Ording | |
| 6,442,590 B1 | 8/2002 | Inala et al. | |
| 6,460,081 B1 | 10/2002 | Doherty et al. | |
| 6,717,607 B1* | 4/2004 | Lauper | H04N 7/142 348/14.08 |
| 6,785,708 B1 | 8/2004 | Busey et al. | |
| 7,149,776 B1* | 12/2006 | Roy et al. | 709/205 |
| 7,185,056 B2* | 2/2007 | Fujisawa et al. | 709/205 |
| 7,263,526 B1 | 8/2007 | Busey et al. | |
| 7,343,567 B2 | 3/2008 | Mann et al. | |
| 7,933,955 B2 | 4/2011 | Khalatian | |
| 8,046,259 B1 | 10/2011 | Siegel et al. | |
| 8,117,560 B1* | 2/2012 | Lu et al. | 715/789 |
| 8,495,660 B1 | 7/2013 | Hernacki | |
| 8,842,156 B1 | 9/2014 | Alekhin | |
| 9,313,332 B1 | 4/2016 | Kumar et al. | |
| 2002/0038346 A1 | 3/2002 | Morrison et al. | |
| 2002/0101445 A1* | 8/2002 | Berque | G06Q 10/10 715/751 |
| 2002/0191028 A1 | 12/2002 | Senechalle et al. | |
| 2003/0085923 A1 | 5/2003 | Chen et al. | |
| 2003/0088623 A1 | 5/2003 | Kusuda | |
| 2003/0093464 A1 | 5/2003 | Clough et al. | |
| 2004/0075619 A1 | 4/2004 | Hansen | |
| 2004/0078441 A1 | 4/2004 | Malik et al. | |
| 2004/0080504 A1 | 4/2004 | Salesky et al. | |
| 2004/0252185 A1* | 12/2004 | Vernon | G06Q 10/10 348/14.08 |
| 2004/0253991 A1 | 12/2004 | Azuma | |
| 2005/0129275 A1* | 6/2005 | Porter | G06K 9/00228 382/103 |
| 2005/0129277 A1* | 6/2005 | Porter | G06K 9/00228 382/103 |
| 2005/0141694 A1 | 6/2005 | Wengrovitz | |
| 2005/0223343 A1* | 10/2005 | Travis | G06F 3/0481 715/862 |
| 2005/0235014 A1 | 10/2005 | Schauser et al. | |
| 2005/0246634 A1 | 11/2005 | Ortwein et al. | |
| 2005/0268237 A1 | 12/2005 | Crane et al. | |
| 2006/0031779 A1 | 2/2006 | Theurer et al. | |
| 2007/0038956 A1 | 2/2007 | Morris | |
| 2007/0245249 A1 | 10/2007 | Weisberg | |
| 2008/0016155 A1 | 1/2008 | Khalatian | |
| 2008/0052377 A1 | 2/2008 | Light | |
| 2008/0209387 A1* | 8/2008 | Biehl | G06F 8/71 717/100 |
| 2008/0276183 A1 | 11/2008 | Siegrist et al. | |
| 2009/0024952 A1* | 1/2009 | Brush | G06Q 10/109 715/781 |
| 2009/0055500 A1 | 2/2009 | Haynes et al. | |
| 2009/0100328 A1 | 4/2009 | Asakawa et al. | |
| 2009/0158163 A1 | 6/2009 | Stephens et al. | |
| 2009/0164581 A1 | 6/2009 | Bove et al. | |
| 2009/0219379 A1* | 9/2009 | Rossato | G06T 7/0083 348/14.01 |
| 2009/0247136 A1 | 10/2009 | Srinivasan et al. | |
| 2009/0327441 A1 | 12/2009 | Lee et al. | |
| 2010/0017412 A1* | 1/2010 | Horowitz et al. | 707/10 |
| 2010/0036670 A1 | 2/2010 | Hill et al. | |
| 2010/0037153 A1 | 2/2010 | Rogers | |
| 2010/0111406 A1 | 5/2010 | Hertzfeld et al. | |
| 2010/0115042 A1 | 5/2010 | Turner | |
| 2010/0131868 A1* | 5/2010 | Chawla | G06F 3/044 715/759 |
| 2010/0199187 A1* | 8/2010 | Lin | H04L 12/581 715/733 |
| 2010/0257457 A1* | 10/2010 | De Goes | H04L 65/1093 715/751 |
| 2010/0296646 A1 | 11/2010 | Hemm et al. | |
| 2010/0306642 A1 | 12/2010 | Lowet et al. | |
| 2011/0087984 A1 | 4/2011 | Jitkoff et al. | |
| 2011/0173256 A1 | 7/2011 | Khalatian | |
| 2011/0307402 A1 | 12/2011 | Krishnakumar et al. | |
| 2012/0069045 A1* | 3/2012 | Hashimoto | G06F 3/1415 345/589 |
| 2012/0185784 A1 | 7/2012 | Katz | |
| 2012/0254770 A1 | 10/2012 | Ophir | |
| 2013/0055113 A1 | 2/2013 | Chazin et al. | |
| 2013/0080928 A1 | 3/2013 | Zhuang et al. | |
| 2013/0212466 A1 | 8/2013 | Khalatian | |
| 2014/0119531 A1 | 5/2014 | Tuchman et al. | |
| 2014/0161241 A1 | 6/2014 | Baranovsky et al. | |
| 2014/0173078 A1 | 6/2014 | McCord et al. | |
| 2014/0278534 A1 | 9/2014 | Romeo | |
| 2015/0052067 A1 | 2/2015 | Thiyagarajan et al. | |
| 2015/0244814 A1 | 8/2015 | Khalatian et al. | |
| 2015/0310446 A1 | 10/2015 | Tuchman et al. | |
| 2015/0324772 A1 | 11/2015 | Sarris | |
| 2016/0182721 A1 | 6/2016 | Khalatian et al. | |

OTHER PUBLICATIONS

U.S. Appl. No. 11/456,613, Jul. 13, 2009, Final Office Action.
U.S. Appl. No. 11/456,613, May 6, 2010, Non-Final Office Action.
U.S. Appl. No. 11/456,613, Jan. 12, 2011, Notice of Allowance.
U.S. Appl. No. 13/071,607, Aug. 5, 2011, Non-Final Office Action, Aban.
U.S. Appl. No. 13/762,725, Apr. 9, 2015, Non-Final Office Action.
Brandon De Hoyos, How to Use Facebook Chat Options, about. com, pp. 1-6, http://im.about.com/od/facebookcha1/ss/facebookchatoptions.htm, (Facebook Chat Options for Facebook Chat.pdf).
Dictionary.com, Jul. 27, 2011, https://web.archive.org/web/20110727234611/http://dictionary,reference.com/browse/Expand, (Expand.pdf), pp. 1-2.
Final Office Action for U.S. Appl. No. 13/762,725, mailed on Nov. 12, 2015, all pages.
Advisory Action for U.S. Appl. No. 13/762,725, mailed on Feb. 3, 2016, all pages.
U.S. Appl. No. 13/762,725, Nov. 12, 2015, Final Office Action.
U.S. Appl. No. 13/762,725, Feb. 3, 2016, Advisory Action.
SocialTimes, Facebook Chat Launches—Tour & First Impressions, Apr. 6, 2008, pp. 1-5.
Bold Software Partners with LiveLOOK to Enhance BoldCCM Product Suites, www.prweb.com/releases/BoldSoftware/LiveLOOK/prweb2536784.htm, date web page visited: Nov. 17, 2009, 2 pages.
Bosco's Screen Share: Web Screen Sharing, Hutchings Software, <http://web.archive.org/web/20050305232959/www.componentx.com/ScreenShare/web.php>, Mar. 5, 2005, 7 pages.
Free Web Conferencing and Always-On Collaboration, www.vyew.com, Jul. 25. 2006, 20 pages.
Instant Screen Sharing with no download . . . , web page; showscreen.com/screen_sharing_partners, date web page visited: Jan. 3, 2010, 3 pages.
Instant Service Adds LiveLOOK's CoBrowsing Capabilities to Chat Solution, www.instantservice.com/news/20071106.html, date web page visited: Nov. 17, 2009, 2 pages.
LiveLOOK is a leading provider of real-time . . . , www.livelook.com/about_us.asp, date web page visited: Jan. 7, 2010, 2 pages.
News Release, New Jersey Economic Development Authority, Nov. 2008, 2 pages.
nGenera CIP Partners with LiveLOOK, Enhances Its Multi-Channel Solution by Boosting the Power of NGen CoBrowse, web page; www.reuters.com/article/pressRelease/idUS120651 +14-Apr-2009 +BW20090414, date web page visited: Nov. 17, 2009, 3 pages.
PictureTalk FAQs, Pixion, Inc., <http://web.archive.org/web/20050305010259/www.pixion.com/supportFaq.html>, Mar. 5, 2005, 7 pages.
Press Release, LiveLOOK wins "Best Technology" at Web 2.0 Summit, Jun. 21, 2007, 1 page.
Screen-Sharing: One-Click Solution Lets Anyone Screen-Share Instantly From Any OS-LiveLOOK, web page: www.masternewmedia.org, date web page visited: Jan. 6, 2010, 14 pages.

(56) References Cited

OTHER PUBLICATIONS

TightVNC Java Viewer version 1.2.9, TightVNC project, <http://lweb.archive.org/web/2003081 0163821/tightvnc.com/doc/java/READM E. txt>, Aug. 10, 2003, 8 pages.

WebsiteAiive Chooses Live look to Offer Instant Sceen Sharing, websitealive.com/articles-press/websitealive-chooses- livelook, date web page visited: Jan. 3, 2010, 2 pages.

Andersen, GUI Review: Gmail® by Google®, Nov. 5, 2011, pp. 1-26.

Antoine et al., Java applet screenshot, USENET thread, <http://www.velocityreviews.com/forums/t136047-java-appletscreenshot.html, Aug. 12, 2004, 6 pages.

Ohren, Facebook Updates Chat UI—It's Faster & More Stable, Oct. 6, 2010, pp. 1-5.

Siden, Signed Applet Tutorial, <http://web.archive.org/web/20060513070748/http:1/www-personal.umich. edu/ -Isiden/tutorials/signed-appletlsignedapplet.html>, Internet Archive on May 13, 2006, pp. 1-5.

Udell, Simple, single-purpose screen sharing, www.infoworld.com/prinU25674; published on InfoWorld, date web page visited: Jan. 3, 2010, 2 pages.

International Application No. PCT/US2007/073209, International Preliminary Report on Patentability mailed on Jan. 13, 2009, 8 pages.

International Application No. PCT/US2007/073209, International Search Report and Written Opinion mailed on Aug. 13, 2008, 8 pages.

U.S. Appl. No. 11/456,613, Final Office Action mailed on Jul. 13, 2009, 18 pages.

U.S. Appl. No. 11/456,613, Non-Final Office Action mailed on Aug. 8, 2008, 16 pages.

U.S. Appl. No. 11/456,613, Non-Final Office Action mailed on May 6, 2010, 22 pages.

U.S. Appl. No. 11/456,613, Notice of Allowance mailed on Jan. 12, 2011, 7 pages.

U.S. Appl. No. 13/071,607, Non-Final Office Action mailed on Aug. 5, 2011, 22 pages.

U.S. Appl. No. 13/762,725, Non-Final Office Action mailed on Apr. 9, 2015, 19 pages.

U.S. Appl. No. 13/762,725, Non-Final Office Action mailed on May 5, 2016, 17 pages.

U.S. Appl. No. 14/851,268, Non-Final Office Action mailed on May 9, 2016, 15 pages.

\* cited by examiner

CO-BROWSING SYSTEMS AND METHODS

RELATED APPLICATIONS

This application claims the benefit of U.S. Provisional Application No. 61/288,118, filed Dec. 18, 2009, titled "Field Masking" and of U.S. Provisional Application No. 61/289,499, filed Dec. 23, 2009, titled "Limiting Co-browsing to the Browser", the entireties of which applications are incorporated by reference herein.

FIELD OF THE INVENTION

The invention relates generally to screen sharing between computing systems connected to a network.

BACKGROUND

Screen sharing between computing devices over a network has a myriad of practical applications. One practical application is collaboration between a host and a viewer. A host can give a presentation to one or more remote viewers, perform demonstrations, review documents, and share images. As an example of another practical use, screen sharing enables remote technical support. For example, by watching the keystrokes entered by a host, remote technical support staff can diagnose problems as though the present on site.

Often, during a screen-sharing session, the host can have several items visible on the desktop of the computer screen, which the hosts would prefer not to share, such items as icons, open applications, or browser windows. Before starting the screen-sharing session, the host would then need to remove or close such items. This is usually inconvenient and sometimes impractical. During other types of screen-sharing occasions, hosts may need to enter confidential information, such as a credit card numbers or personal identification numbers, which should not be shared.

SUMMARY

In one aspect, the invention features a method for sharing a screen of a host computing system with an agent computing system. At a time before capturing the screen of the host computing system, each open window corresponding to a browser process is identified. Certain information is acquired about each browser process. It is determined, in response to the certain information acquired about each browser process, whether the open window corresponding to that browser process is eligible for screen capture. For each eligible open window, each visible portion of that eligible open window is captured. Capture of an image on the screen of the host computing system is limited to each visible portion of each eligible open window.

In another aspect, the invention features a screen-sharing system including a server system conducting a screen-sharing session between a host computing system and an agent computing system over a network. The server system transmits a web page to the host computing system. The web page includes embedded computer-readable program code to be executed by the host computing system when a browser running on the host computing system displays the web page.

The computer-readable program code comprises: computer-readable program code configured to identify, at a time before capturing a screen of the host computing system, each open window corresponding to a browser process; computer-readable program code configured to acquire certain information about each browser process; computer-readable program code configured to determine, in response to the certain information acquired about each browser process, whether the open window corresponding to that browser process is eligible for screen capture; computer-readable program code configured to calculate, for each eligible open window, each visible portion of that eligible open window; and computer-readable program code configured to limit capture of an image on the screen of the host computing system to each visible portion of each eligible open window.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Web-based screen-sharing systems described herein employ standard browser technology to share the screen image of a host computing system with one or more agent computing systems in near real-time. Because browser technology has become widespread, most any web-enabled computing system can participate in screen sharing. Such screen sharing through browsers is often referred to as co-browsing. As used herein, a host is a user or online visitor who is showing his or her computer screen and an agent is a user who is remotely viewing the host's computer screen.

In brief overview, an agent computing system (a viewer) and a host computing system (a screen sharer) are coupled to a server system over a network. The host computing system and agent computing systems each communicates with the server system through their own web browser. Upon visiting the server system, the host computing system automatically downloads and executes an applet that includes screen-capture program code. The screen sharing works with the screen of the host computing system as an image. Currently available software (e.g., JAVA version 1.3 and higher) includes program code for capturing the pixel data of the host screen image.

Upon automatically executing this host applet, the host computing system sends the captured image data to the server. During an established screen-sharing session, the browser of the agent computing system also downloads an applet from the server. This applet continuously sends requests for image data to the server. In response, the server supplies image data received from the host. The agent computing system repaints its display screen with the received image data, thus reproducing the image of the host screen at the agent computing system. An example implementation of screen sharing is described in U.S. patent application Ser. No. 11/456,613, filed Jul. 11, 2006 (which published as Pub. No. 2008/0016155 on Jan. 17, 2008), the entirety of which application is incorporated by reference herein.

As described herein, various mechanisms enhance the web-based co-browsing by filtering out or masking, from image capture or sharing, certain content that is visible on the screen of the host computing system. Such mechanisms include limiting the shared content to what appears only within a browser window; sharing permitted browser windows only; masking certain visible regions appearing anywhere on the host screen or confined to a browser window; and various combinations thereof.

Figure 1:
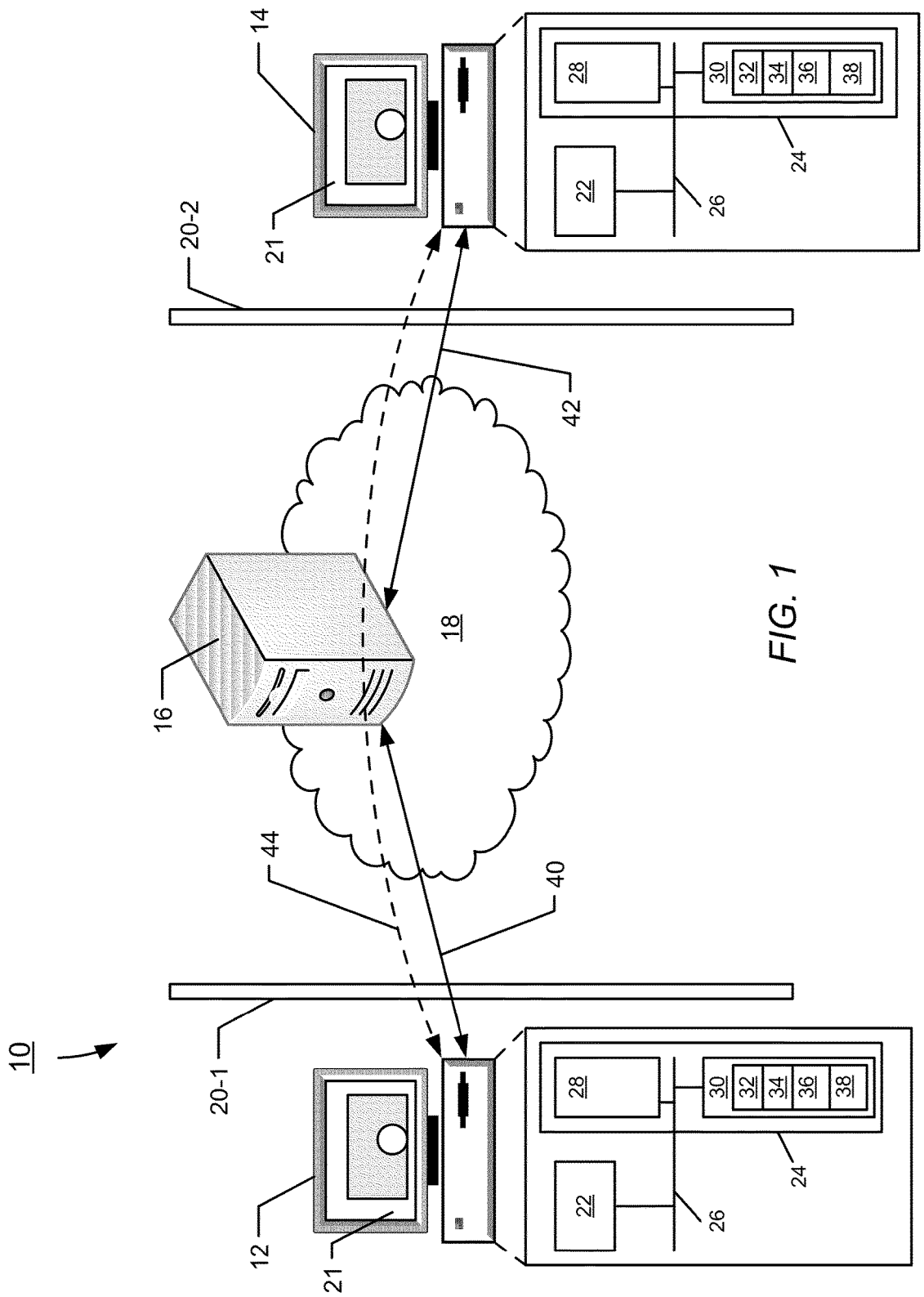
FIG. 1 is a block diagram representation of an embodiment of a screen-sharing system including a server computing system in communication with an agent computing system and a host computing system.

FIG. 1 shows an embodiment of a screen-sharing system 10 configured for screen sharing. The screen-sharing system 10 includes a host computing system 12 and an agent computing system 14 in communication with a server system 16 over a network 18. Each of the host and agent computing systems 12, 14 may reside behind a respective firewall 20-1, 20-2. As described herein, the firewalls 20-1, 20-2 do not impede screen sharing between the host and agent computing systems 12, 14.

Each computing system 12, 14 includes a display screen 21 and a processor 22 in communication with system memory 24 over a signal bus 26. Exemplary implementations of the computing systems 12, 14 include, but are not limited to, personal computers (PC), Macintosh computers, workstations, laptop computers, kiosks, hand-held devices, such as a personal digital assistant (PDA), cellular phones, smartphones, Apple iPads™, Amazon.com KINDLEs®, navigation and global positioning systems, and network terminals.

The system memory 24 includes non-volatile computer storage media, such as read-only memory (ROM) 28, and volatile computer storage media, such as random-access memory (RAM) 30. Typically stored in the ROM 28 is a basic input/output system (BIOS), which contains program code for controlling basic operations of the computing systems 12, 14 including start-up of the computing device and initialization of hardware. Stored within the RAM 30 are program code and data. Program code includes, but is not limited to, application programs 32, program modules 34 (e.g., browser plug-ins), a native API (e.g., Windows API, MacOS API) 36, and an operating system 38 (e.g., Windows 95, Windows 98, Windows NT 4.0, Windows XP, Windows 2000, Linux, Macintosh, Windows Mobile™, Mobile Linux™, Symbian OS™, Palm OS™, Mobile OS™, and Android™).

Application programs 32 on the computing systems 12, 14 include browser software. The browser software can be any commercially available Web browser, e.g., Microsoft INTERNET EXPLORER®, Mozilla FIREFOX®, NETSCAPE®, Opera Software OPERA™, and Apple SAFARI®. Currently, most computing devices already have an installed browser when purchased from a manufacturer and deployed in the business, enterprise, or home. A web browser may use a hypertext transfer protocol (HTTP) to transfer or convey information with a web server, which can store or create resources such as hypertext markup language (HTML) files and images. When the browser of a computing system visits a Web site with an embedded applet, the computing system automatically downloads the applet from the Web server and automatically executes it. Execution of the applet may require the support of various browser plug-ins 34 (e.g., JAVA, ACTIVEX).

The browser of each computing system 12, 14 can be a JAVA-enabled browser with an interpreter, e.g., a JAVA virtual machine, for interpreting JAVA bytecode (i.e., applets, scripts) and applications. Most commercially available Web browsers have the JAVA bytecode interpreter built into the Web browser. In some operating systems, the Java Virtual Machine is installed on the computing system independently of the browser. Because they are translated into an intermediate processor-independent bytecode supported by Java Virtual Machine, JAVA applets are operating system independent. In other embodiments, the browser of the agent computing system 14, the browser of the host computing system 12, or browsers of both computing systems 12, 14 are ACTIVEX-enabled, which execute downloaded ActiveX controls. In general, the principles of the invention apply to any browser capable of running applets or controls that perform screen capture.

Other application programs 32 can include, but are not limited to, an electronic mail client program, an instant messaging, and office applications, such as spreadsheet, word processor, and slide presentation software. Each application program 32 can be a proprietary or commercially available program and can run in conjunction with screen sharing.

Typically, the signal bus 26 connects the processor 22 to various other components of the computing system 12, 14 including, for example, a user-input interface, a memory interface, a peripheral interface, a video interface, a local network interface, and a wide-area network interface (not shown). The display screen 21 connects to the signal bus 26 through the video interface. Exemplary implementations of the signal bus include, but are not limited to, a Peripheral Component Interconnect (PCI) bus, an Industry Standard Architecture (ISA) bus, an Enhanced Industry Standard Architecture (EISA) bus, and a Video Electronics Standards Association (VESA) bus. Over a wire or wireless link, the user-input interface is in communication with one or more user-input devices, e.g., a keyboard, a mouse, trackball, touch-pad, touch-screen, microphone, joystick, by which a user can enter information and commands into the computing system 12, 14. Each computing system 12, 14 can reside behind a firewall 20-1, 20-2, such as ZoneAlarm™, a MICROSOFT XP® built-in, or Norton Security™ firewalls, or external firewalls to isolate the computing system from the network 18.

Embodiments of the network 18 include, but are not limited to, local-area networks (LAN), metro-area networks (MAN), and wide-area networks (WAN), such as the Internet or World Wide Web. Each computing system 12, 14 can connect to the server 16 over the network 18 through one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g)). Broadband Internet access through, e.g., cable and DSL (Digital Subscriber Line), provide sufficient bandwidth for transporting screen-captured image data.

Figure 2:
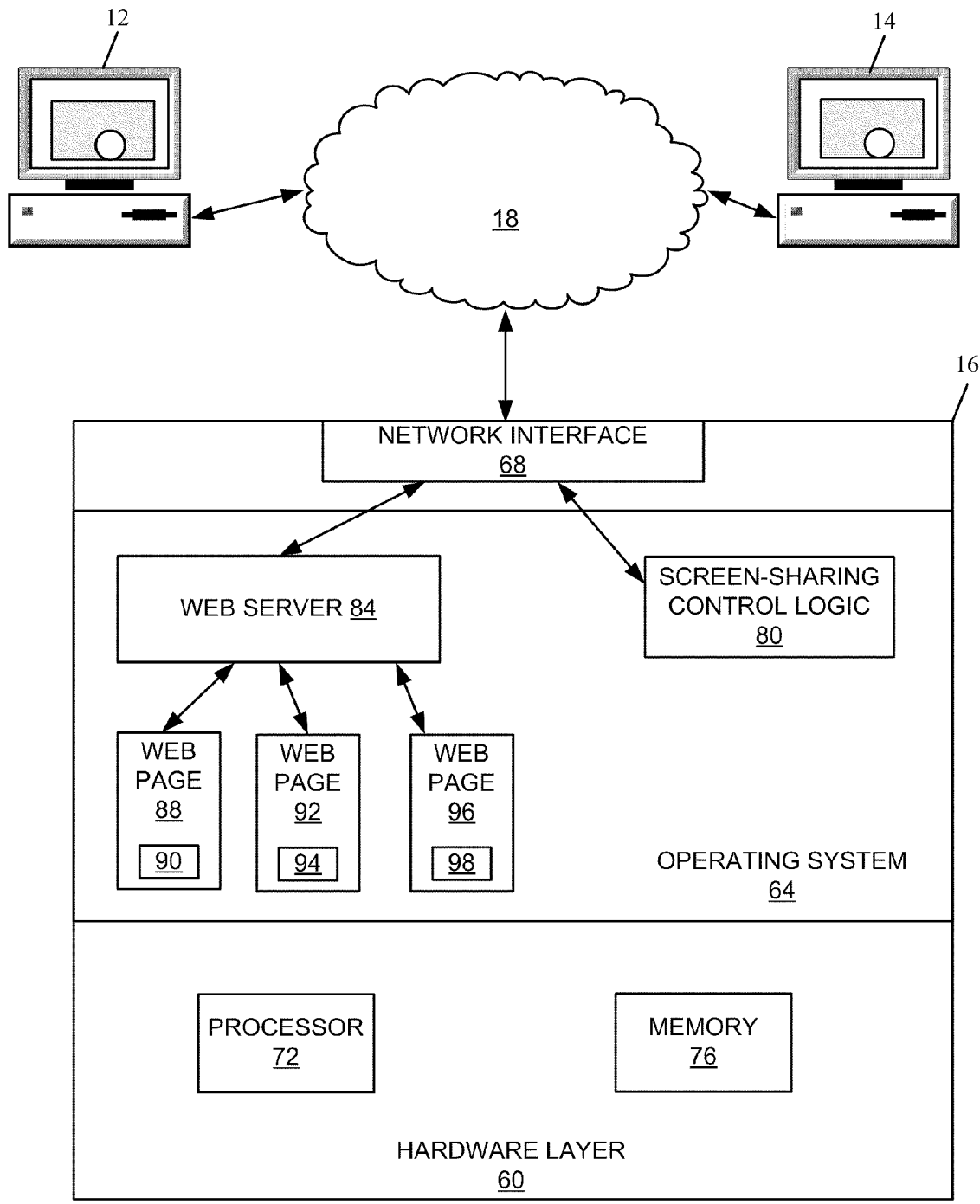
FIG. 2 is a block diagram representation of an embodiment of the server computing system.

FIG. 2 shows an embodiment of the server computing system 16 including a hardware layer 60 and an operating system 64. A network interface 68 couples the server computer system 16 to the network 18. The hardware layer 60 includes a processor 72 and memory 76.

Running on the operating system 64 is screen-sharing control 80 logic and a Web server 84. In general, the screen-sharing control logic 80 orchestrates a screen-sharing session between a host computing system and an agent computing system (also called a guest) as described in the aforementioned patent application Ser. No. 11/456,613. The server computing system 16 establishes a first HTTP connection 40 with the host computing system 12 and a second HTTP connection 42 with the agent computing system 14. By the first connection 40, the server computing system 16 continuously receives image (i.e., pixel) data corresponding to the screen image of the host computing system 12. Over the second connection 42, the server computing system 16 continuously receives requests for image data from the agent computing system 14 and responds with image data received from the host computing system 12. In effect, the server 16 is the hub of a connection 44 (FIG. 1) established between the host computing system 12 and the agent computing system 14 for purposes of screen sharing.

The Web server 84 receives HTTP requests to access web pages identified by URLs and provides the appropriate web page to the requesting computing system 12, 14. One such web page 88 includes embedded program code 90 to be downloaded by the browser running on the host computing system in order to host a screen-sharing session; another web page 92 includes embedded program code 94 to be downloaded by the agent computing system in order to view the screen of the host.

Agents download web page 96 to access a configuration utility, referred to herein as the Administration Panel, through which the agent can configure various parameters and features in order to customize the performance of screen-sharing sessions involving the agent's own web pages (i.e., the host is sharing and the agent is viewing the agent's preconfigured web page). Through this Administration Panel, an agent can copy and paste HTML code 98 into a web page at locations deemed appropriate by the agent in order to mask text entered into fields of the web page, as described herein. In general, the HTML code 98 includes JavaScript code and Java applets, which, when executed, draws borders of a specific color around a select field and ensures that any text entered into the field has a specific color (the same color as or different from the border color). These applets and specifically colored features support processes for locating and masking content within a captured screen image. In addition, the coordinates specified by these applets can be used to locate borders of fields identified by agents for masking, as described further below.

In addition, through this configuration utility, agents generate an inclusion list and an exclusion list. Each list contains a plurality of character strings. Each character string corresponds to a title, a portion of the title, a URL or portion thereof, an IP address or portion thereof, or a keyword. For purposes of field masking, an agent can also configure the colors for the field borders and text. Generally, the inclusion list identifies windows of interest to the agent, windows that may be shared during a screen-sharing host; the exclusion list identifies windows that are not to be shared during a screen-sharing host; that is, if any such window is open during screen-sharing, the window should be masked.

Figure 3:
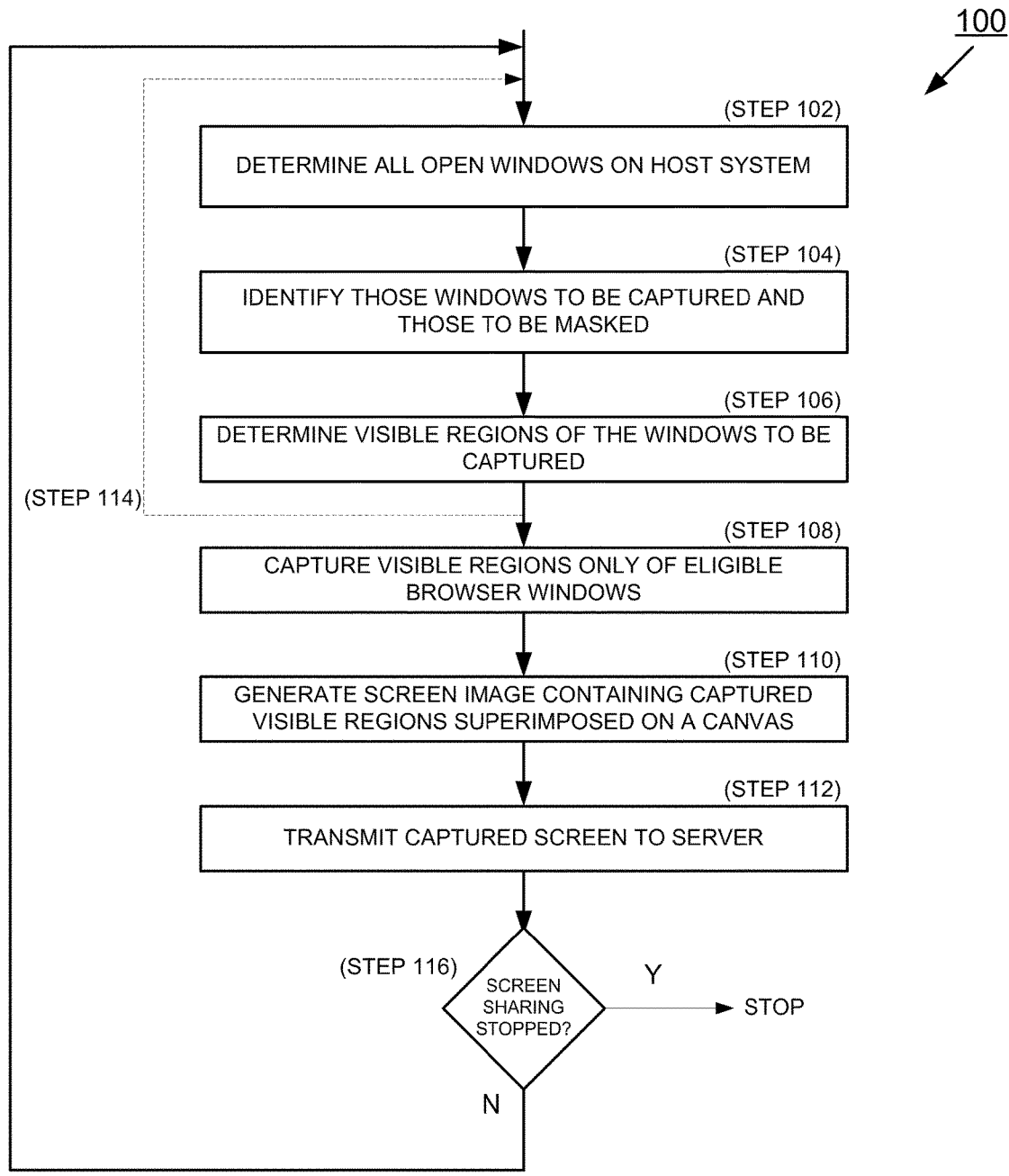
FIG. 3 is a flow diagram of an embodiment of a process by which the screen sharing is limited to browser windows.

FIG. 3 is a flow diagram of an embodiment of a process 100 by which the screen sharing is limited to browser windows. In the description of the process, reference is also made to FIG. 1 and FIG. 2. The process 100 runs on the host computing system 12 in response to downloading the web page 88 and executing the embedded program code 90 (referred to herein for clarity purposes as applet 90). Execution of the applet 90 causes the loading of a DLL (dynamic link library) file. In case of MacOS, a .so file is downloaded instead of .dll file). The DLL file (or .so file) is downloaded in a subsequent communication by the already loaded applet with the server system. Execution of the DLL program code in the DLL file makes procedure calls to the operating system 38 through the native API 36.

Before each capture of the screen, through procedure calls to the native API the DLL program code generates (step 102) a list of all open windows on the host computing system 12, including the following information about each open window: its process ID, process name, window title, coordinates of the top-left corner of the window, and the dimensions of the window. The DLL program code also obtains the z-order of the windows (e.g., the window on top having the lowest z value). An open window is not necessarily a visible window, because a given open window may be occluded by one or more other open windows (i.e., on top of the given open window). Minimized and hidden windows are filtered out.

At step 104, the DLL program code identifies those windows to be image-captured and those windows to be masked. In one embodiment, the list of open windows is divided into two sub-lists: a first sub-list contains those open windows to be candidates for image capture; a second sub-list contains those open windows to be masked. The allocating of the open windows to one sub-list or the other occurs using 'process names' and optionally 'titles' and/or 'URLs" of the windows, as described herein.

To be added to the first sub-list of windows to be image captured, a given open window should satisfy the following criteria: the process name of the window name should match one of the predefined browsers, for example, Microsoft INTERNET EXPLORER®, Mozilla FIREFOX®, NETSCAPE®, Opera Software OPERA™, Google Chrome™, and Apple SAFARI®. In addition, if further filtering is implemented based on title or URL, the title or URL (whichever is used) must match one of the strings listed in the inclusion list and must not contain any of the strings listed in the exclusion list. Other criteria can be used to decide whether to include or exclude a window based on the title or URL (e.g., the use of an inclusion list only or of an exclusion list only, with the determining factor of inclusion or exclusion being whether the title or URL is on the particular list). These lists are incorporated as parameters of the applet tag within the HTML code of the downloaded web page. All open windows that do not satisfy these criteria are placed in the second sub-list for those open windows to be masked. All open windows satisfying these criteria are deemed eligible for screen capture.

Figure 4:
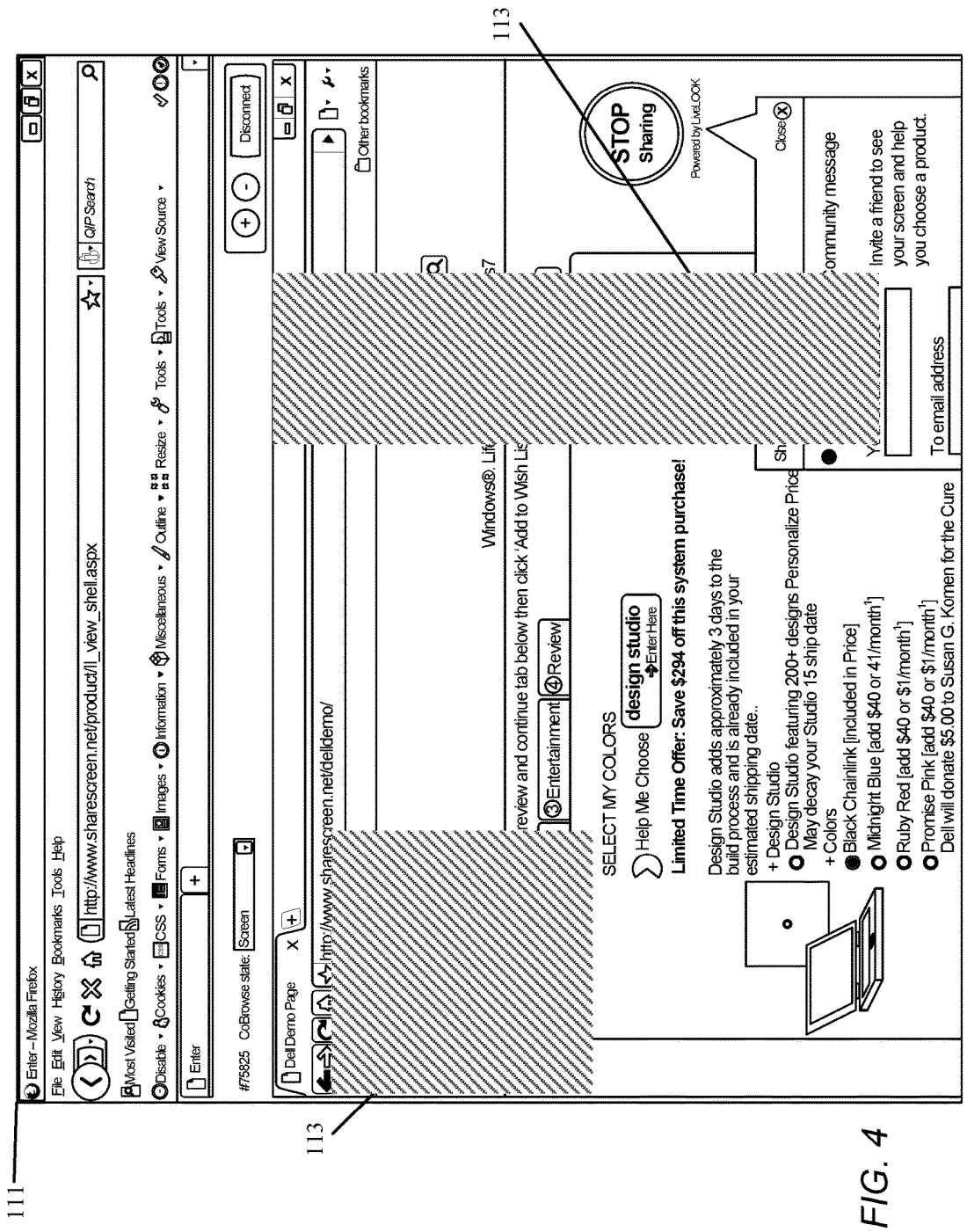
FIG. 4 is a diagram of an example of a captured image screen with masked regions corresponding to regions not to be shared.

In response to the first and second sub-lists and the z-order property associated with each of the open windows, the applet 90 further computes (step 106) all visible regions of those open windows eligible for screen capture. The applet 90 then captures (step 108) visible regions only of eligible windows. The captured visible regions are overlaid (step 110) upon a canvas equal in size to the size of the host screen. In general, the canvas has a background pattern that would enable a viewer to recognize that material has been masked without the background pattern becoming confused with the captured image. In one embodiment, the background pattern is a hatched pattern. The resulting screen display, an illustrative example of which appears in FIG. 4, has a composite of the captured image data 111 and the hatched masked regions 113. In effect, the captured screen display is limited to the visible content within eligible browser windows only. The host computing system 12 transmits (step 112) this captured screen image 111, with masked regions 113, to the server system 16.

Because the process of capturing takes time, conceivably the size and location of any given window might change. To increase the reliability of the results that non-displayable regions are not captured and shared, steps 102, 104, and 106 can be repeated (step 114). In this instance, the applet 90 recalculates and renders the visible regions on the canvas based on the results of both passes through steps 102, 104, and 106. If, at step 116, the screen-sharing session is still in progress, the process 100 of limiting co-browsing to visible content within permitted browser windows repeats from step 102.

In those embodiments that use URLs of web pages to determine whether a given window is to be masked, the technique for extracting a URL from a browser differs depending on the browser type. For example, to extract a URL from Mozilla Firefox®, Apple Safari®, and Microsoft Internet Explorer® browsers, the DLL program code uses Microsoft (MS) Active Accessibility API. Microsoft Active Accessibility is a Component Object Model (COM)-based technology. It provides dynamic-link libraries that are incorporated into the operating system. A COM interface and API elements provide methods for exposing information about user interface (UI) components. In general, the DLL program code queries the active browser for specific accessible UI components using the MS Active Accessibility API through the COM interface.

Because the location bars (a rectangular field typically found at the top of the browser window) of Internet Explorer and Firefox browsers are included in their accessible UI components, the DLL program code parses the hierarchy of the UI components to find the corresponding element and get its value. The acquired value is the URL of the page, which appears in the browser window. Different types and versions of the browsers have different hierarchy of UI components. According, the DLL program code includes program code configured specifically for each type and version.

Because the UI components of Google Chrome® types of browsers are not accessible through the MS Active Accessibility API, the DLL program code accesses their UI components through the Windows API (also known as WinAPI). The WinAPI is a core set of application programming interfaces available in the Microsoft Windows operating systems. Through the WinAPI, the DLL program code locates the window associated with the Google Chrome location field (the location fields of Google Chrome browsers are implemented as separate windows and the URLs of the opened pages are captions (titles) of those windows) and extracts its title.

In some instances, usage of the MS Active Accessibility API can make screen sharing slower, because it depends on the response time of the browser (that is, responses by the browser to the query for the location field text). Occasionally, browsers can become overloaded. As for the window captions-based technique, the returned value always corresponds to the current value of Google Chrome's location field, which sometimes is different from the actually opened page's URL. The location field can also be different, for example, when the user edits the URL, but does not submit it.

To overcome these situations, in response to identifying a window that should be masked, the DLL program code changes the title of the browser window by pre-pending or appending one or more certain characters, for example, spaces, to the front or to the end of the title. Spaces are preferred because they are likely to go unnoticed or cause confusion by the user. Upon the next occurrence of screen capture, the applet 90 looks for those certain characters in the currently opened browser windows. If the applet 90 finds the certain characters at the beginning or the end of the browser title, depending upon the particular implementation, the applet 90 does not call the DLL program code to use the location extraction technique for finding the URL. Should the user browse to another web page, the title of the browser automatically changes, and the DLL program code again extracts the location to acquire the URL for subsequent comparison with items on the sub-lists.

Figure 5:
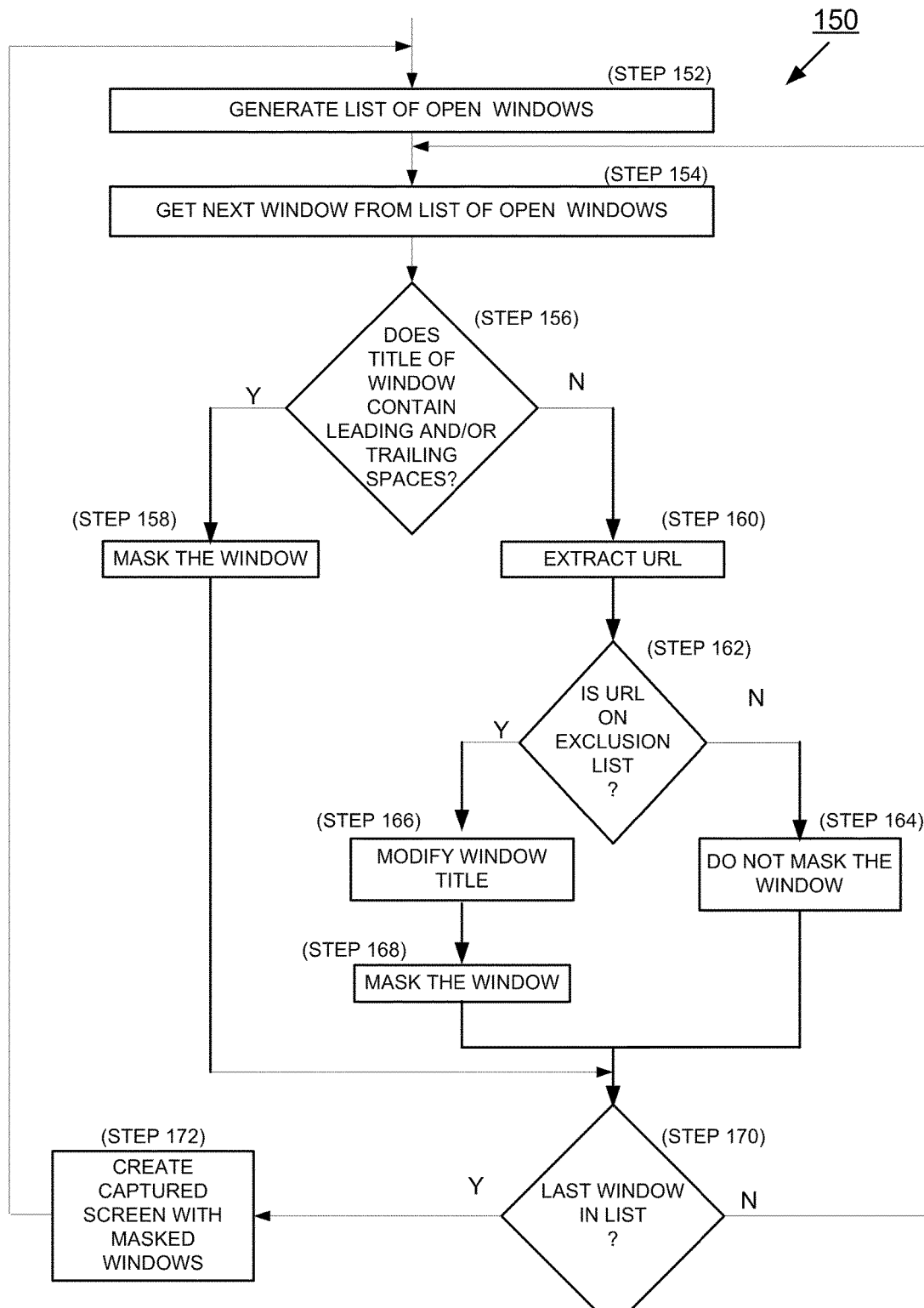
FIG. 5 is a flow diagram of an embodiment of a process by which browser-window-filtering based on URLs can be accelerated.

FIG. 5 shows an embodiment of a process 150 for enhancing URL-based screen capture during a screen sharing session. At step 152, the DLL program code generates list of open windows running on the host computing system 12. One window is taken (step 154) from the list for processing. The title of window is examined (step 156) to determine if it has one or more special characters in the leading or trailing positions of the title. Such characters would be an indicator that the window had already been placed on the exclusion list during a previous screen capture. If the special character(s) are found is in the title, at step 158 the window is masked. Otherwise, if the title lacks the special character(s), the URL is extracted (step 160) using the aforementioned extraction technique.

At step 162, it is determined whether the extracted URL satisfies certain criteria: for example, the URL matches a string in the inclusion list and does not match any string in the exclusion list. If the URL satisfies the criteria, the window is not masked (step 164). Otherwise, the title of the window is changed (step 166) to have the special leading or trailing characters and masked (step 168).

If, at step 170, this is not the last of the open windows, the process 150 continues with the next window, which is taken at step 154. If this is the last of the open windows, the visible portions of the eligible open windows are screen captured for transmission to the server system 16. Provided screen sharing is continuing, the process 150 repeats from step 152, at which a new list of open windows is generated.

In addition to or instead of masking browser windows, another masking technique, referred to as field masking, masks regions of the screen or fields in a captured window in order to enhance security and the privacy of masked data. Three mechanisms can be employed to achieve field masking. They are: (1) masking by border color; (2) masking by text color; and (3) masking by border applets. These mechanisms operate individually or together in any combination on a captured image of screen, which is transferred after masking to the server system for subsequent transmission to the agent computing system and display on the agent console. When the host computing system downloads the web page 88 with the applet 90, execution of the applet 90 causes the loading and execution of DLL program code used to help find and mask regions in a captured screen image, as described below.

To enable field masking of select fields or regions, a web page developer places certain HTML code 98 (FIG. 2) into the web page where the select fields are located. The HTML code has border color and text color parameters for purposes of adding colored borders and changing text color to select fields in the developer's web page. The value of these border color and text color parameters can be also changed from the Administration Panel. In one embodiment, four Java applets produce the borders around a select field. When the browser on the host computing system displays the developer's web page, the four embedded applets execute and produce borders of the specified color around the select field. Applets are used because changing the accessibility option of the browser does not affect colors produced by the applets, and so the borders of the bounded field are certain to have the specified color after acquisition of the URL or title. In addition, these applets are used explicitly in one of the masking mechanisms. Also, the field is given an appropriate background color.

Figure 6:
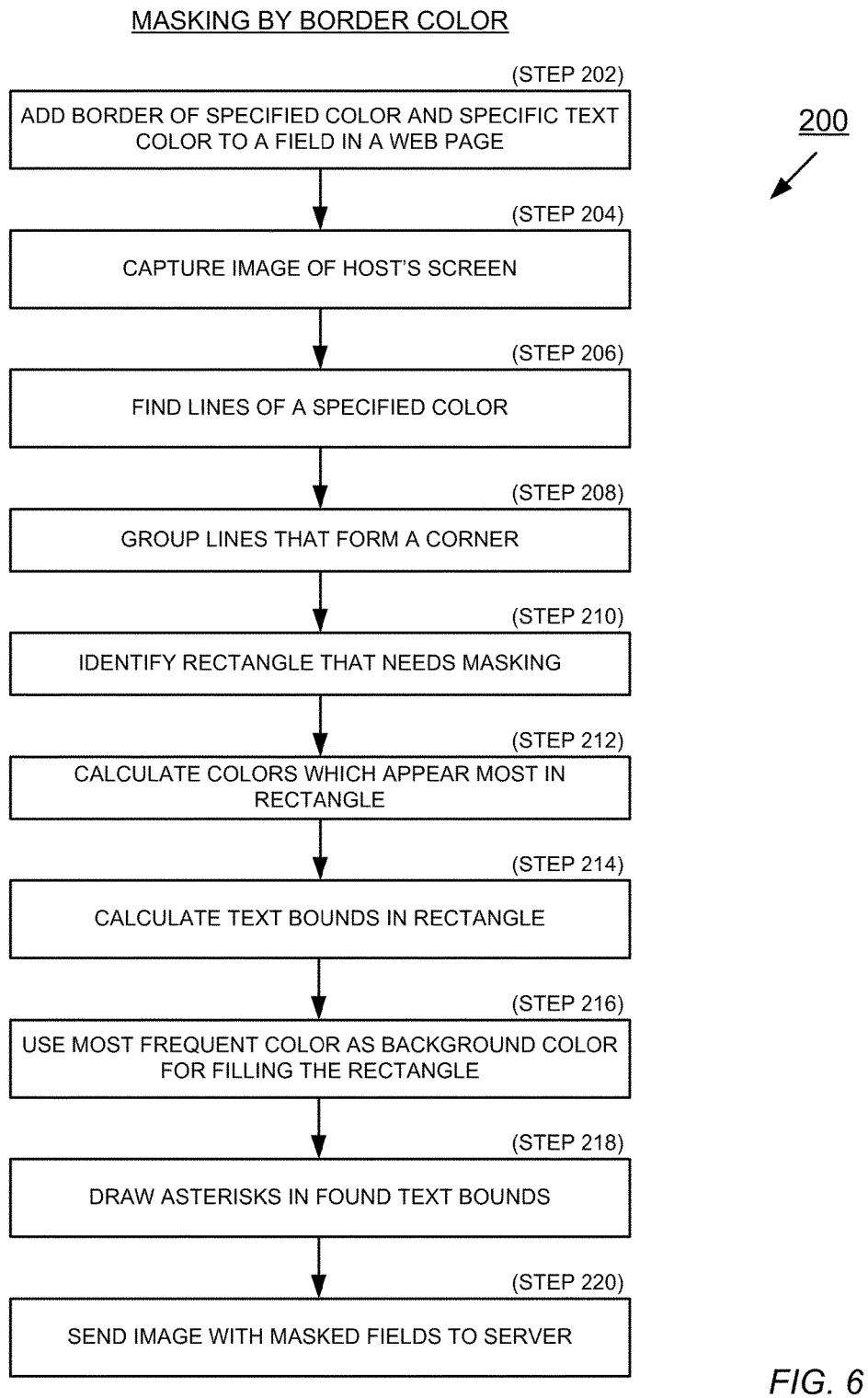
FIG. 6 is a flow diagram of an embodiment of a process for masking regions of a captured screen.

FIG. 6 shows of an embodiment of a process 200 for masking regions of a captured screen using border color. At step 202, a border of specified color is added to a field in a web page. Additionally, a color for text in the field is specified. This association of color to borders and text of a field occurs at the web page developer (or agent-related) site. At step 204, the applet downloaded to the host computing system 12 captures the screen (with or without browser window filtering described above). At step 206, the applet 90 iteratively parses the pixels of the captured screen image to find all lines of specified color. The search for the specified color uses an approximation. In one embodiment, the approximation is equal to plus or minus 10 on a 255-scale color base. For example, if the specified border color is RGB (13, 80, 82), then the color of each pixel is compared with a color range of RGB (3, 70, 72) to RGB (23, 90, 92).

The applet iteratively examines (step 208) the lines found in step 206, and groups them by putting lines which form a corner in the same group. Groups thus correspond to rectangles that may have content that is to be masked. The colors that appear most frequently in a rectangle are determined (step 210). In general, the color of highest frequency is the background color, and serves to be the masking color. By comparing colors of pixels within the rectangle, the bounds (i.e., pixel locations) of the text in the rectangle are calculated. The colors of pixels at a border will be known to have been reached because of its specified color in contrast to the known color of the background or text within the rectangle. The found background color is used to fill the rectangle within its determined bounds. This produces blank (i.e., empty field). At step 216, asterisks (or some other characters suitable for signifying masked text) are drawn in the text bounds.

Figure 7A:
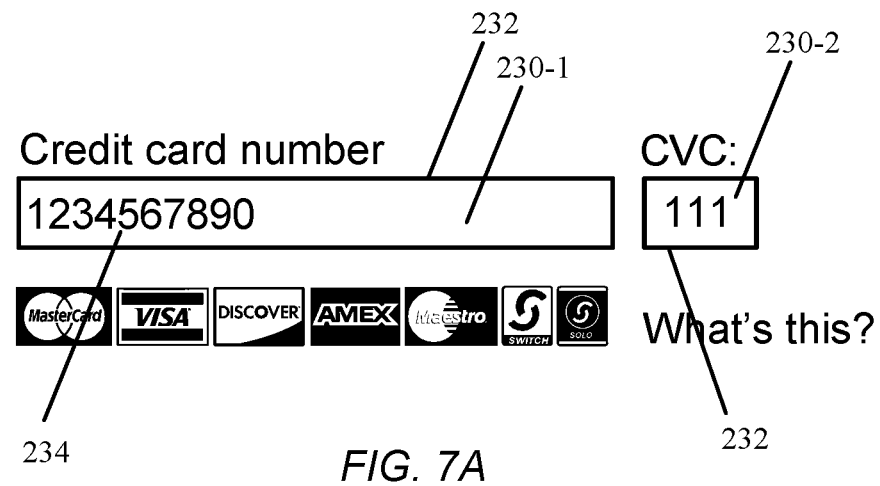
FIG. 7A is a diagram of an example of a field designated for masking as the field appears on the screen of the host computing system.
Figure 7B:
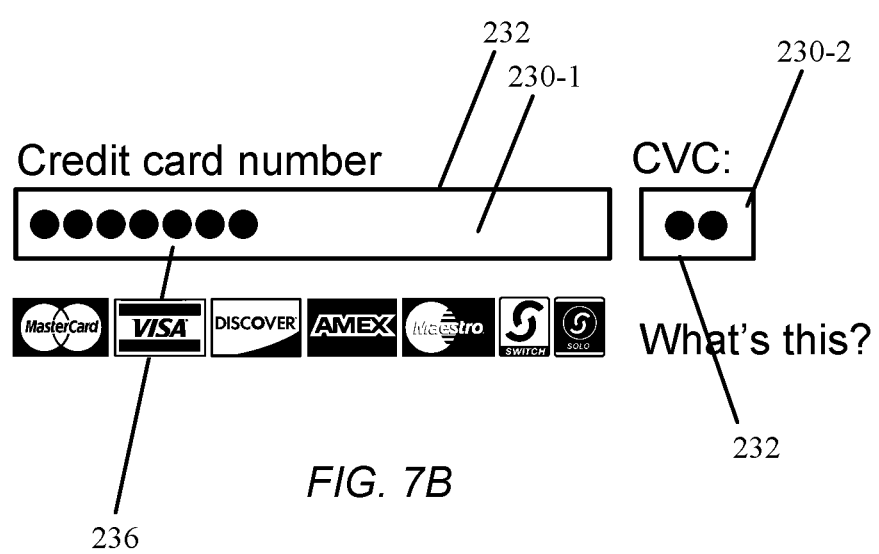
FIG. 7B is a diagram of the field of FIG. 7A as the field appears on the screen of the agent computing system.

FIG. 7A and FIG. 7B show an example of field masking before and after masking. FIG. 7A shows two fields 230-1 and 230-2 as they appear on the display screen of the host computing system. The fields 230-1, 230-2 have dark borders 232 (of special color for purposes of locating these fields in a bitmap image). The text 234 entered in the fields 230-1 and 230-2 remains in clear at the host computing system 12. FIG. 7B shows the two fields 230-1 and 230-2 as they appear on the display screen of the agent computing system 14. The text has been masked by darkened circles 236.

The color of text within a specified field can also serve to find content that is to be masked. The applet iteratively parses over the pixels of a captured screen image, and finds rectangles which contain text of specified color. The search for text of the specified color can use an approximation to produce a pixel color range in similar fashion to that previously described. If the rectangles found by searching for specifically colored text do not match those rectangles found by searched for borders of a specified color (presuming both techniques are being used in conjunction), the steps 210, 212, 214 and 216 of FIG. 7 can be repeated.

In addition to or instead of searching for borders and/or text of a specified color, the third mechanism, called masking by applets, does not entail analyzing the pixels of a captured screen image. For this mechanism, the DLL program code calls the native API 36 (of the host computing system). The native API provides two functionalities: (1) retrieving all browser windows with their properties (process id, process name, location, size etc.); (2) retrieving all child windows with their properties (location, size, etc.) by specified ClassName property. The four previously mentioned applets are child windows of browsers. The native API retrieves all running applets' windows in all browsers. An applet window's ClassName property has a "SunAwt-Canvas" value. The four applets identify the locations on the screen and dimensions of the corresponding borders. The applet 90 uses these four applets to find "the lines", grouping the lines into rectangles, identifying the background color, calculating the text bounds, and filling the text bounds with the background color. This technique 'empties' the field, but does not draw asterisks within the field. The field is blank when the screen is captured.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

The computer readable medium may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

In addition, the described methods can be implemented on an image-processing device, or the like, or on a separate programmed general purpose computer having image processing capabilities. Additionally, the methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the image processing system according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, a microprocessor, or the like. In these instances, the systems and methods of this invention can be implemented as program embedded on personal computer such as JAVA® or CGI script, as a resource residing on a server or graphics workstation, as a plug-in, or the like. The system can also be implemented by physically incorporating the system and method into a software and/or hardware system, such as the hardware and software systems of an image processor.

While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method for sharing a screen of a host computing system with an agent computing system, the method comprising:
generating, at a time before capturing the screen of the host computing system, a first list of each open window on the host computing system;
determining, for each open window in the list of open windows, whether the open window is eligible for screen capture by:
identifying whether the open window corresponds to a browser process and designating as ineligible the open window if it does not correspond to the browser process;
extracting a URL (Universal Resource Locator) from the open window corresponding to the browser process, the extracted URL identifying a web page presented in the open window from which the URL is extracted;
searching an inclusion list to find a match to the URL and designating as ineligible the open window if no match is found on the inclusion list;
searching an exclusion list to find a match to the URL and designating as ineligible the open window if a match is found on the exclusion list; and
designating as eligible the open window if it is not designated as ineligible;
calculating, for each eligible open window, each visible portion of that eligible open window;
limiting capture of an image on the screen of the host computing system to each visible portion of each eligible open window;
masking a text field of the captured image by:
parsing pixels of the captured image to find a rectangle of a specified color;
calculating a color that appears most frequently within the rectangle as a background color; and
filling the rectangle with the background color; and
transmitting the captured image with the masked text field for sharing with the agent computing system.

2. The method of claim 1, wherein the masking the text field of the captured image further comprises drawing an asterisk within the rectangle.

3. The method of claim 1, further comprising masking a second text field of the captured image by:
parsing pixels of the captured image to find text of a second specified color within a second rectangle; and
filling the second rectangle with the background color.

4. The method of claim 1, further comprising:
acquiring child processes of each browser process;
identifying a rectangular region based on the child processes; and
masking the identified rectangular region.

5. The method of claim 1, wherein the step of searching the inclusion list to find a match to the URL includes comparing the URL extracted from the open window with one or more strings in the inclusion list, each string in the inclusion list being associated with content that is eligible for screen sharing with the agent computing system; and
wherein searching the exclusion list to find a match to the URL includes comparing the URL extracted from the open window with one or more strings in the exclusion list, each string in the exclusion list being associated with content that is ineligible for screen sharing with the agent computing system.

6. The method of claim 5, further comprising populating the inclusion list and the exclusion list through an administration panel on the host computing system.

7. The method of claim 1, further comprising
repeating, before capturing the image on the screen of the host computing system, the steps of generating, determining, and calculating in order to recalculate each visible portion of each eligible open window; and
wherein the step of limiting capture of the image on the screen of the host computing system is based on results produced by both calculations.

8. The method of claim 1, further comprising painting each captured screen image on an image canvas having a size of the screen of the host computing system.

9. A screen-sharing system comprising:
a processor; and
a memory coupled with and readable by the processor and having stored therein a set of instructions which, when executed by the processor, causes the processor to:
generate, at a time before capturing a screen of a host computing system, a first list of each open window on the host computing system;
determine, for each open window in the list of open windows, whether the open window is eligible for screen capture by:
identifying whether the open window corresponds to a browser process and designating as ineligible the open window if it does not correspond to the browser process,
extracting a URL (Universal Resource Locator) from the open window corresponding to the browser process, the extracted URL identifying a web page presented in the open window from which the URL is extracted,
searching an inclusion list to find a match to the URL and designating as ineligible the open window if no match is found on the inclusion list,
searching an exclusion list to find a match to the URL and designating as ineligible the open window if a match is found on the exclusion list, and
designating as eligible the open window if it is not designated as ineligible;
calculate, for each eligible open window, each visible portion of that eligible open window,
limit capture of an image on the screen of the host computing system to each visible portion of each eligible open window,
mask a text field of the captured image by:
parsing pixels of the captured image to find a rectangle containing text of a specified color,
calculating a color that appears most frequently within the rectangle as a background color, and
filling the rectangle with the background color, and
transmit the captured image with the masked text field for sharing with an agent computing system.

10. The screen-sharing system of claim 9, wherein the set of instructions to mask the text field of the captured image further includes instructions to draw an asterisk within the rectangle.

11. The screen-sharing system of claim 9, wherein the set of instructions further causes the processor to mask a second text field of the captured image by:
parsing pixels of the captured image to find a second rectangle of a second specified color; and
filling the second rectangle with the background color.

12. The screen-sharing system of claim 9, wherein the set of instructions further causes the processor to:
acquire child processes of each browser process;
identify a rectangular region based on the child processes; and
mask the identified rectangular region.

13. The screen-sharing system of claim 9, wherein the set of instructions further causes the processor to:
repeat, before capturing the image on the screen of the host computing system, the steps of generating, determining, and calculating in order to recalculate each visible portion of each eligible open window; and
wherein limiting capture of the image on the screen of the host computing system is based on results produced by both calculations.

14. The screen-sharing system of claim 9, wherein the set of instructions further causes the processor to paint each captured screen image on an image canvas having a size of the screen of the host computing system.

15. The screen-sharing system of claim 9, wherein searching the inclusion list to find a match to the URL includes comparing the URL extracted from the open window with one or more strings in the inclusion list, each string in the inclusion list being associated with content that is eligible for screen sharing with the agent computing system; and
wherein searching the exclusion list to find a match to the URL includes comparing the URL extracted from the open window with one or more strings in the exclusion list, each string in the exclusion list being associated with content that is ineligible for screen sharing with the agent computing system.

16. The screen-sharing system of claim 15, further comprising populating the inclusion list and the exclusion list through an administration panel on the host computing system.

* * * * *